United States Patent [19]

Masuda et al.

[11] Patent Number: 5,194,411
[45] Date of Patent: Mar. 16, 1993

[54] CATALYST COMPOSITIONS AND PROCESS FOR MAKING THE SAME

[75] Inventors: Tatsuo Masuda; Morio Fukuda; Masahiro Nishi, all of Kitakyushu, Japan

[73] Assignee: Catalysts & Chemicals Industries Co., Ltd., Tokyo, Japan

[21] Appl. No.: 795,587

[22] Filed: Nov. 21, 1991

[30] Foreign Application Priority Data

Nov. 30, 1990 [JP] Japan ................................. 2-336409

[51] Int. Cl.$^5$ .......................... B01J 29/06; B01J 27/18
[52] U.S. Cl. ....................................... 502/64; 502/60; 502/68; 502/521
[58] Field of Search ................... 502/64, 68, 521, 60; 208/114

[56] References Cited

U.S. PATENT DOCUMENTS

| 3,507,773 | 4/1970 | Gladrow et al. | 208/111 |
| 3,852,188 | 12/1974 | Dugan et al. | 208/114 |
| 4,158,621 | 6/1979 | Swift et al. | 208/114 |
| 4,451,355 | 5/1984 | Mitchell et al. | 208/113 |
| 4,765,884 | 8/1988 | Walker et al. | 208/114 |
| 4,791,084 | 12/1988 | Sato et al. | 502/65 |
| 4,919,787 | 4/1990 | Chester et al. | 208/114 |
| 4,948,769 | 8/1990 | Chapple | 502/68 |

FOREIGN PATENT DOCUMENTS

| 0188841 | 7/1986 | European Pat. Off. . |
| 0204543 | 7/1986 | European Pat. Off. . |
| 204543 | 12/1986 | European Pat. Off. ............ 502/521 |

Primary Examiner—Carl F. Dees
Attorney, Agent, or Firm—Panitch, Schwarze, Jacobs & Nadel

[57] ABSTRACT

Catalyst compositions and a process for making the same are disclosed. The composition finds application in the cracking of heavy hydrocarbon feedstock containing vanadium and other metal contaminants. It essentially comprises a crystalline zeolite, a metal trapping or passivating agent and an inorganic oxide matrix precursor and is characterized by minimum elution of an alkaline earth metal in the catalyst.

11 Claims, 2 Drawing Sheets

CATALYST COMPOSITIONS AND PROCESS FOR MAKING THE SAME

BACKGROUND OF THE INVENTION

1. Field of the Invention

This invention relates to catalyst compositions useful for the cracking or conversion of hydrocarbon feedstocks containing vanadium and other contaminating metals which have a deleterious effect upon the activity and selectivity of the catalyst.

The invention is also directed to the process of preparing such catalyst compositions.

2. Prior Art

It is widely recognized that metal contaminants such as notably vanadium present in heavy petroleum-derived hydrocarbon feedstocks react with the active components of crystalline zeolite catalysts and destroy their crystalline structure, leading to severely reduced catalytic activity. It has been proposed to use various compounds such as typically alkaline earth metal compounds to passivate or immobilize vanadium and other metal contaminants deposited on the catalyst as disclosed in for example Japanese Laid-Open Patent Publications 61-149241 and 62-38242.

The alkaline earth metal compounds are known for their good ability to render metal contaminants inert, but have the problem that the alkaline earth metal dispersed in an inorganic oxide matrix tends to mobilize during the course of catalytic cracking reaction and cause a zeolite such as a crystalline aluminosilicate zeolite to decline in its thermal stability and undergo destruction of its crystalline structure, or further tends to be incorporated by ion exchange into the zeolite thereby inviting considerable decrease in the octane number of catalytically cracked gasoline products. Furthermore, some of the alkaline earth metals admixed with an inorganic oxide matrix precursor in the preparation of a crystalline aluminosilicate zeolite catalyst are prone to elute and ion-exchange with the zeolite or react with the precursor to adversely affect the physical properties and performance of the resultant catalyst.

SUMMARY OF THE INVENTION

With the foregoing problems of the prior art in view, the present invention seeks to provide an improved catalyst composition for use in the catalytic cracking of hydrocarbon feedstocks which incorporates a metal trapping agent capable of passivating or immobilizing metal contaminants present in the feedstock during the catalylic cracking thereof.

More specifically, the invention is aimed at sustaining the intrinsic advantageous capabilities of an alkaline earth metal used as a metal trapping component to combat the attack of vanadium and other contaminating metal deposits on the catalyst so that the deleterious effects of the contaminant metals can be effectively eliminated.

The invention therefore provides a catalyst composition which is tailored to hold reactive mobilization of the alkaline earth metal components to an absolute minimum.

The invention further provides a process useful for preparing the above catalyst compositions.

The foregoing and other objects and features of the invention will appear manifest upon reading the following detailed description.

According to a first aspect of the invention, there is provided a catalyst composition for hydrocarbon cracking which comprises: a crystalline aluminosilicate zeolite; a metal trapping agent comprising a mixture of an alkaline earth metal oxide and a refractory oxide excluding a combination of magnesia and alumina; and an inorganic oxide matrix excluding alumina-magnesia matrix; the catalyst composition, when dipped in HCl solution having a pH of 3.0 at 30° C. for 20 minutes, having an alkaline earth metal eluted in an amount of less than 6.0 percent by weight in terms of oxide based on the weight of total alkaline earth metal component present in the catalyst composition.

According to a second aspect of the invention, there is provided a process for the preparation of a catalytic cracking catalyst composition which comprises the steps of: calcinating a metal trapping agent at a temperature above 850° C. and treating the metal trapping agent with a phosphoric ion-containing aqueous solution, the metal trapping agent being comprised of a mixture of precursors of an alkaline earth metal oxide and a refractory oxide excluding a combination of magnesia and alumina; making an admixture of the metal trapping agent with a crystalline aluminosilicate zeolite and a precursor of an inorganic oxide matrix excluding alumina-magnesia matrix; and spray-drying the admixture into a particulate product.

According to a third aspect of the invention, there is provided a process for the preparation of a catalytic cracking catalyst composition which comprises the steps of: calcinating a metal trapping agent at a temperature above 850° C., the trapping agent being comprised of a mixture of precursors of an alkaline earth metal oxide and a refractory oxide excluding a combination of magnesia and alumina; making an admixture of the trapping agent with a crystalline aluminosilicate zeolite and a precursor of an inorganic oxide matrix excluding alumina-magnesia matrix; spray-drying the admixture into a particulate product; and treating the particulate product with a phosphoric ion-containing aqueous solution.

DETAILED DESCRIPTION OF THE INVENTION

Figure 1:
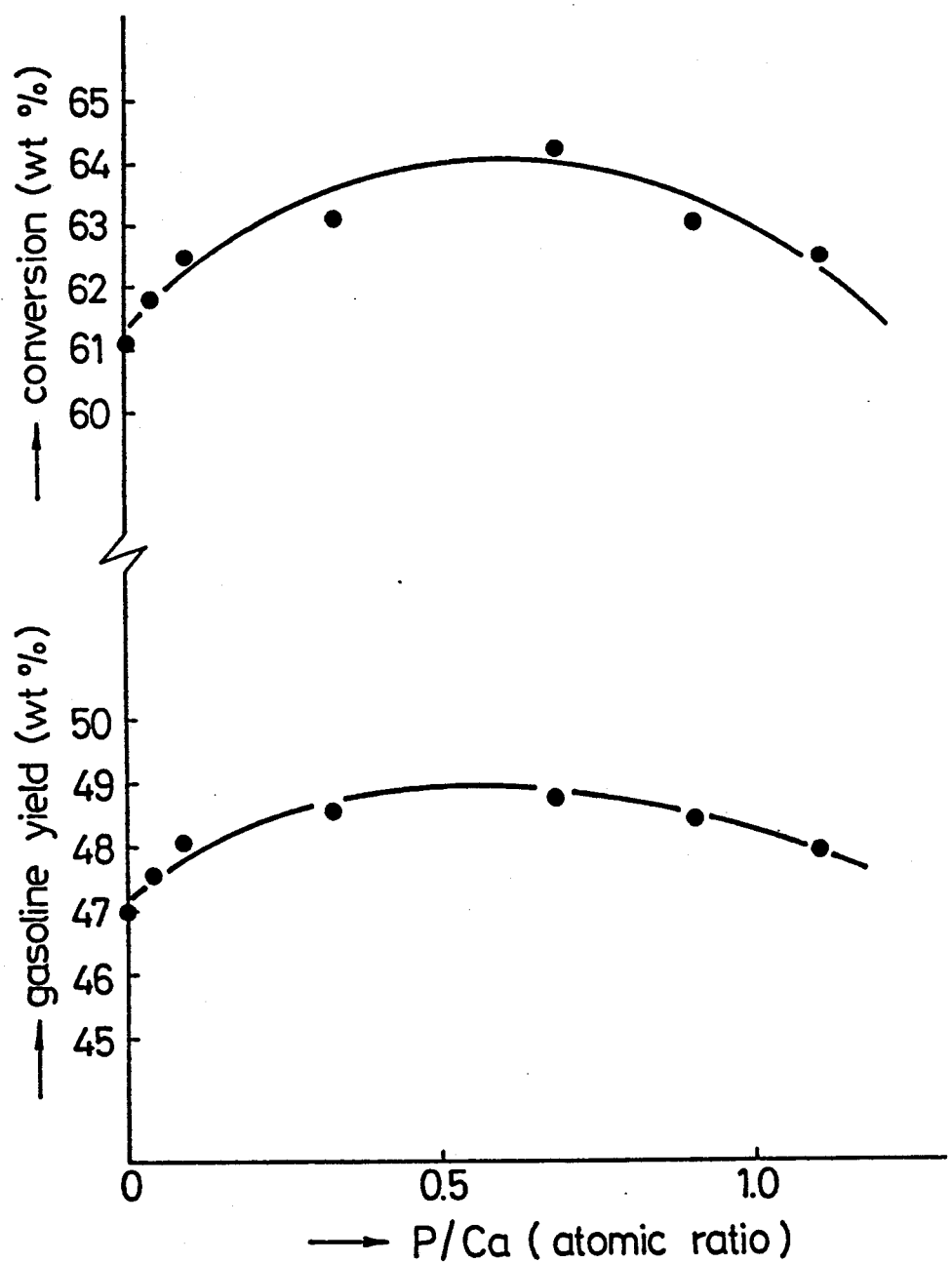
FIG. 1 is a graph utilized to show metal tolerances of the catalyst composition obtained in Inventive Example 1, in which phosphorus (P)/calcium (Ca) atomic ratios in the catalyst composition are plotted against gasoline yields and conversion rates, respectively, that are available from catalytic cracking where 10,000 ppm of vanadium and nickel were deposited on the inventive catalyst.

The catalyst compositions provided in accordance with the invention find effective application as a cracking catalyst typically in the refinery process for the conversion of petroleum-derived heavy hydrocarbon feedstocks to gasoline and other light distillates.

Crystalline aluminosilicate zeolites used in the invention include X-zeolite, Y-zeolite, ZSM-zeolite and mordenite, either natural or synthetic, which are exchanged with cations of hydrogen, ammonium or polyvalent metals as practiced in the usual process for preparation of cracking catalysts. Y-zeolite and particularly ultrastable Y-zeolite are preferred as they are highly hydrothermally stable.

The term metal trapping agent as used herein designates a mixture obtained from precursors of an alkaline earth metal oxide and a refractory oxide excluding a combination of magnesia and alumina. It may be in the form of a complexed oxide or a crystalline compound. The metal trapping agent may be also admixed with sepiolite, talc, wollastonite and like minerals. Alkaline earth metals eligible for the purpose of the invention are Group II-A elements of the Periodic Table such as Mg, Ca, Sr and Ba. The element to be oxidized to provide a refractory oxide precursor is one selected from the group of Si, Al, Ti and Zr.

The alkaline earth metal oxide forming one part of the metal trapping agent of the invention thus includes MgO, CaO, SrO and BaO, and the refractory oxide forming the other part of the trapping agent thus includes $SiO_2$, $Al_2O_3$, $TiO_2$, $ZrO_2$, $SiO_2$-$Al_2O_3$, $SiO_2$-$TiO_2$, $SiO_2$-$ZrO_2$, $Al_2O_3$-$ZrO_2$, $TiO_2$-$ZrO_2$, $Al_2O_3$-$TiO_2$ and $ZiO_2$-$Al_2O_3$-$TiO_2$. The alkaline earth metal oxide is used relative to the refractory oxide preferably in a molar ratio of 0.3–1.5.

Typical examples of the metal trapping agent include admixtures of $MgO$-$SiO_2$, $CaO$-$SiO_2$, $SrO$-$SiO_2$, $BaO$-$SiO_2$, $CaO$-$Al_2O_3$, $SrO$-$TiO_2$, $BaO$-$ZrO_2$, $MgO$-$SiO_2$-$Al_2O_3$, $CaO$-$SiO_2$-$TiO_2$, $SrO$-$Al_2O_3$, $BaO$-$Al_2O_3$, $MgO$-$TiO_2$, $CaO$-$TiO_2$, $BaO$-$TiO_2$, $MgO$-$ZrO_2$, $CaO$-$ZrO_2$, $CaO$-$SiO_2$-$Al_2O_3$, $MgO$-$CaO$-$SiO_2$, $MgO$-$CaO$-$Al_2O_3$ and $MgO$-$CaO$-$Al_2O_3$-$TiO_2$.

The metal trapping agent is desirably in the form of fine particles having an average particle size of less than 60 microns, preferably in the range of 0.1–50 microns, more preferably in the range of 0.1–30 microns.

It has been found that the use of a phosphoric ion-containing aqueous solution serves to prevent a decline in the hydrothermal stability of the catalyst composition which would otherwise result from the alkaline earth metal intruding into the crystalline structure of the aluminosilicate zeolite during the catalytic cracking reaction. The phosphoric ion-containing aqueous solution includes an aqueous solution of phosphoric acid, ammonium hydrogen phosphate, ammonium phosphate and phosphoric acid ester as well as mixtures thereof. According to the invention, the phosphoric ion-containing aqueous solution is added in an amount such that it remains in the catalyst composition in terms of phosphorus (P) relative to the alkaline earth metal (M) at an atomic ratio P/M of 0.05–1.2, preferably 0.10–1.0. Ratios smaller than 0.05 would produce no appreciable effect and those larger than 1.2 would result in the majority of the alkaline earth metal being bonded to phosphorus at the sacrifice of its passivating effect upon metal contaminants. This amount of the alkaline earth metal represents a total of this and other alkaline earth metals which may be present in an inorganic oxide matrix used in the invention.

The inorganic oxide matrix referred to herein is a typical matrix component for a cracking catalyst which may be derived from a sol or gel precursor of silica, silica-alumina, alumina, silica-magnesia, phosphorus-alumina, silica-zirconia and silica-magnesia-alumina. Such matrix components include inorganic oxides other than those in the metal trapping agent such as kaolin, halloysite and montmorillonite.

The various components and their respective quantities used in the inventive catalyst composition are tabulated below:

| Catalyst composition | Amount | |
|---|---|---|
| (1) aluminosilicate zeolite | 5–50 wt %, | preferably 5–40 wt % |
| (2) metal trapping agent | 3–50 wt %, | preferably 5–30 wt % |
| (3) inorganic oxide matrix | 10–90 wt %, | preferably 20–90 wt % |
| (4) Phosphorus (P)/alkaline earth metal (M) by atomic ratio | 0.05–1.2, | preferably 0.10–1.0 |

The catalyst composition is prepared according to the invention generally as follows. A slurry of a precursor of inorganic oxide matrix such as silica hydrosol and silica-alumina hydrosol, a crystalline aluminosilicate zeolite and a metal trapping agent is prepared. The slurry is spray dried in the usual manner, in which instance the metal trapping agent is calcined at a temperature above 850° C., preferably above 900° C., more preferably above 1,000° C. for a period of longer than 0.2 hour, preferably longer than 0.5–10 hours, followed by contacting with a phosphoric ion-containing aqueous solution. This contacting may be conducted before, during or after the metal trapping agent is mixed with the inorganic oxide matrix precursor. For instance, the metal trapping agent is calcined at above 850° C. and thereafter contacted with the phosphoric ion-containing aqueous solution, followed by addition together with the crystalline aluminosilicate zeolite to disperse uniformly in the inorganic oxide matrix precursor. The resulting slurry is then spray dried. Alternatively, the spray-dried particles may be contacted with the phosphoric ion-containing solution. However, this alternative procedure is not desirable where the deleterious effects by elution of the alkaline earth metal from the metal trapping agent are held to an absolute minimum.

It has now been found that the metal trapping agent having been subjected to calcination at temperatures exceeding 850° C. results with its alkaline earth metal component eluting to an absolute minimum when suspended in water or weak acid solution. It has also been found that the metal trapping agent having been treated with phosphoric ion results with a predetermined amount of its alkaline earth metal component held immobilized by bonding to the phosphorus component thereby precluding the possibility that the crystalline aluminosilicate zeolite would otherwise be structurally destroyed due to declined hydrothermal stability during the preparation or use of the catalyst composition. If the alkaline earth metal elutes in objectionally large quantities, part of the elute undergoes ion exchange with the zeolite to deteriorate the hydrothermal stability of the resultant catalyst or bring about a decrease in the octane number of catalytically cracked gasoline.

According to an important feature of the invention, elution of an alkaline earth metal from the catalyst composition takes place in an amount of less than 6.0 percent by weight, preferably less than 5.0 percent by weight in terms of oxide based on the weight of total alkaline earth metals in the catalyst composition as determined by the following elution test. This test is conducted in which a sample catalyst calcined at 600° C. for one hour is suspended in five times by weight of deionized water in a beaker, followed by titration of a 1N-HCl solution to adjust the pH of the suspension to 3.0 (at 30° C.)

within one minute and maintaining this pH value with agitation for twenty minutes at 30° C., and the suspension is then immediately filtered and washed with deionized water thereby determining the amount of alkaline earth metal which has eluted from the catalyst composition.

According to the process of the invention, the catalyst composition is spray dried into a particulate form, washed, further re-washed if required and dried or dried and calcined as the case may be.

The catalyst composition of the invention may be added with rare earth elements if desired.

The advantages of the invention demonstrated by minimum elution, hence less mobilization of alkaline earth metals, enhanced hydrothermal stability and increased octane number of gasoline product contribute the effective use of the inventive catalysts particularly in the catalytic cracking of heavy hydrocarbon feedstock containing vanadium and other metal contaminants.

The catalysts of the invention may be equally used where the hydrocarbon feedstock is free of contaminating metals and under conventional cracking conditions.

The invention will be further described by way of the following examples.

INVENTIVE EXAMPLE 1

This example features the use of CaO-SiO$_2$-P based metal trapping agent. 113 grams of CaCO$_3$ of aragonite structure and 400 grams of silica sol (30 wt % concentration, tradenamed SI-550 manufactured by Catalysts & Chemicals Industries Co., Ltd., Japan) were mixed with stirring. The resulting admixture was dried at 120° C. for 15 hours to prepare a dried product (X). Part of this product (X) was calcined at 1,000° C. for one hour to obtain a solid mass which was thereafter pulverized into microspheres having an average particle size of 30 microns. The resulting particulate product, i.e. crystalline calciumsilicate had a CaO/SiO$_2$ molar ratio of 0.35 and showed a peak by X-ray diffraction analysis corresponding to a beta-wollastonite crystal. To 50 grams of the resultant calciumsilicate were added 50 grams of deionized water to prepare a 50% slurry which was then admixed under agitation with 25% phosphoric acid. The slurry had a pH of 3.0.

To 4,000 grams of silica hydrosol containing 5 percent by weight of SiO$_2$ were added 350 grams (dry base) of crystalline aluminosilicate Y-zeolite (NH$_4$Y-zeolite) exchanged at 95% with ammonium ions and 250 grams (dry base) of kaolin clay. This admixture was blended with the calciumsilicate slurry. The resultant slurry blend was spray dried, washed and dried thereby producing a catalytic cracking catalyst composition. The resulting composition was analyzed to show the presence of 10 percent by weight of crystalline calciumsilicate particles, 35 percent by weight of NH$_4$Y-zeolite, 1.03 percent by weight of phosphorus (P$_2$O$_5$) and 54.0 percent by weight of inorganic oxide matrix. Its average particle size was 68 microns. This catalyst composition is designated herein as Catalyst D which had an atomic ratio of phosphorus (P) to alkaline earth metal (Ca) of 0.33.

The above procedure of preparing a catalyst was followed except that 25% phosphoric acid solution was added to a slurry of calciumsilicate in an amount tailored to meet with a phosphorus/calcium atomic ratio of 0 (no phosphoric acid added), 0.05, 0.1, 0.75, 1.0 and 1.5, respectively. There were produced a total of six different catalysts designated herein as Catalysts, A, B, C, E, F and G, respectively, each of which contained 35 percent by weight of NH$_4$Y-zeolite. The P/Ca atomic ratios in the finished catalyst compositions A - G (expect D) are 0, 0.04, 0.09, 0.68, 0.9 and 1.1, respectively. P/Ca ratios of phosphoric acid/calciumsilicate slurry blend above 1.5 are indicative of considerable elution of phosphorus during washing of the catalyst.

INVENTIVE EXAMPLE 2

This example features the use of CaO-Al$_2$O$_3$-P based metal trapping agent. 100 grams of particulate CaCO$_3$ of aragonite structure and 118 grams of particulate bauxite containing 86.6 percent by weight of Al$_2$O$_3$ were mixed with stirring. The resulting admixture was calcined at 1,380° C. for one hour, allowed to melt and then cool to provide a solid mass. The mass was pulverized into microspheres having an average particle size of 30 microns. The resulting calciumaluminate particulate product had a CaO/Al$_2$O$_3$ molar ratio of 1.0 and showed a peak by X-ray diffraction analysis corresponding to a calciumaluminate crystal. The procedure of Inventive Example 1 was followed in adding 25% phosphoric acid aqueous solution to a slurry of calciumaluminate to make a P/Ca atomic ratio of 0.4. This slurry was admixed with silica hydrosol, NH$_4$Y-zeolite and kaolin clay. The resulting blended slurry was spray dried into microspheres and washed, followed by treatment with aqueous ammonium phosphate, and thereafter dried to provide a catalytic cracking catalyst composition. This composition was analyzed to show the presence of 35 percent by weight of NH$_4$Y-zeolite, 10 percent by weight of calciumaluminate, 1.37 percent by weight of phosphorus (P$_2$O$_5$) and 53.6 percent by weight of inorganic oxide matrix. Its average particle size was 68 microns. This catalyst composition is designated herein as Catalyst H which had an atomic P/Ca ratio of 0.34.

INVENTIVE EXAMPLE 3

This example deals with the use of MgO-SiO$_2$-ZrO$_3$-P based trapping agent. A slurry of zirconium tetrahydroxide derived from hydrolysis of an aqueous zirconium salt was admixed with MgCl$_2$ aqueous solution and water-glass of 28.2% SiO$_2$ (JIS 3) with stirring, followed by addition of 15% aqueous NH$_3$ to adjust the slurry to a pH of 10. The resulting blended gel was subjected to ageing at 80° C. for one hour and washed with warm water to provide a cake. This cake was dried at 120° C. for 15 hours, thereafter pulverized to an average particle size of 35 microns and calcined at 950° C. for 5 hours to prepare a complex oxide of MgO-SiO$_2$-ZrO$_2$ which had a MgO/SiO$_2$/ZrO$_2$ atomic ratio of 0.5/1.0/0.3. In a manner similar to the procedure of Inventive Example 1, a slurry of the above complex oxide was added with 25% phosphoric acid aqueous solution to make a P/Mg atomic ratio of 0.5. The procedure of Inventive Example 1 was followed in preparing a catalyst composition except for the use of phosphorus-treated SiO$_2$-ZrO$_2$-MgO complex oxide. The resulting catalyst composition was analyzed to show the presence of 10 wt % of SiO$_2$-ZrO$_2$-MgO, 35 wt % of NH$_4$Y-zeolite, 1.60 wt % of phosphorus (P$_2$O$_5$) and 53.4 wt % of inorganic oxide matrix. Its average particle size was 68 microns. The catalyst composition obtained in this example is designated herein as Catalyst I which had a P/Mg atomic ratio of 0.48.

INVENTIVE EXAMPLE 4

This example is directed to the use of MgO-TiO$_2$-P based metal trapping agent. A mixture of magnesium carbonate and titanium oxide in a molar ratio of 1:1 was heat-treated at 1,150° C. for 15 hours to provide a complex oxide which partially exhibited an X-ray diffraction peak analogous to an ilmenite structure. In a manner similar to Inventive Example 1, a slurry of this complex oxide was prepared and added with 25% phosphoric acid aqueous solution to provide a P/Mg atomic ratio of 0.5. The procedure of Inventive Example 1 was followed in preparing a catalyst composition except for the use of phosphorus-treated TiO$_2$-MgO. The resultant catalyst composition contained 10 wt % of complex oxide, 35 wt % of NH$_4$Y-zeolite, 2.75 wt % of phosphorus and 52.2 wt % of inorganic oxide matrix, and had an average particle size of 68 microns. This composition is designated herein as Catalyst J.

INVENTIVE EXAMPLE 5

This example is directed to the use of BaO-ZrO$_2$-P based metal trapping agent. A slurry of zirconium tetrahydroxide derived from hydrolysis of an aqueous zirconium salt was added with aqueous BaCl$_2$ and adjusted in pH to 10.5 with addition of aqueous NH$_3$ under agitation. Aqueous ammonium bicarbonate was added to prepare a slurry blend of zirconium tetrahydroxide and barium carbonate. The slurry was dehydrated, washed with warm water, dried at 110° C. and further calcined at 950° C. for 5 hours thereby providing a BaO-ZrO$_2$ complex oxide which contained 55 wt % of BaO in terms of oxide. In a manner similar to Inventive Example 1, a slurry of BaO-ZrO$_2$ complex oxide was prepared and adjusted in P/Ba atomic ratio to 0.5 with addition of 25% phosphoric acid aqueous solution. Except for the use of this phosphorus-treated complex oxide, the procedure of Inventive Example 1 was followed in preparing a catalyst composition which analytically revealed the presence of 10 wt % of BaO-ZrO$_2$ complex oxide, 35 wt % of NH$_4$Y-zeolite, 1.14 wt % of phosphorus (P$_2$O$_5$) and 53.9 wt % of inorganic oxide matrix and which had an average particle size of 68 microns. This composition is designated herein as Catalyst K.

INVENTIVE EXAMPLE 6

This example features the use of CaO-ZrO$_2$-P based metal trapping agent. A calcium zirconate was prepared by reacting zirconium oxide with calcium chloride at 1,000° C. for 25 hours. It had a calcium/zirconium molar ratio of 1:1. In a manner similar to Inventive Example 1, a slurry of this compound was adjusted in P/Ca atomic ratio to 0.5 with addition of 25% phosphoric acid aqueous solution. Except for the use of this slurry, the procedure of Inventive Example 1 was followed in preparing a catalyst composition which was analyzed to show the presence of 10 wt % of calcium zirconate, 35 wt % of NH$_4$Y-zeolite, 1.83 wt % of phosphorus (P$_2$O$_5$) and 53.2 wt % of inorganic oxide matrix and which had an average particle size of 68 microns. This composition is designated herein as Catalyst L.

COMPARATIVE EXAMPLE 1

Part of a dry product (X) of calciumsilicate obtained in Inventive Example 1 was subjected to calcination at 600° C. for 3 hours. The resulting solid mass was pulverized to an average particle size of 30 microns, and thereafter analyzed by X-ray diffraction to show the particles in amorphous state. The amorphous particulate material thus obtained was treated as in the procedure of Inventive Example 1 to provide a catalyst composition which contained 10 wt % of CaO-SiO$_2$ oxide. This composition is herein designated as Catalyst M.

COMPARATIVE EXAMPLE 2

The procedure of Inventive Example 1 was followed in preparing a catalyst composition except that theta-alumina particles of an average particle size of 10 microns derived from calcinating gamma-alumina at 900° C. were used in place of crystalline calciumaluminate. The catalyst composition obtained in this example contained 10 wt % of theta-alumina particles and 1.0 wt % of phosphorus (P$_2$O$_5$) and is herein designated Catalyst N.

COMPARATIVE EXAMPLE 3

The procedure of Inventive Example 5 for catalyst preparation was followed except that BaO-ZrO$_2$ complex oxide was not treated with phosphoric acid aqueous solution. The catalyst composition obtained in this example is herein designated as Catalyst K-2.

COMPARATIVE EXAMPLE 4

The procedure of Inventive Example 6 was followed for catalyst preparation except that calcium zirconate was not treated with phosphoric acid aqueous solution. The catalyst composition obtained in this example is herein designated as Catalyst L-2.

WORKING EXAMPLE

Catalysts A - N, K-2 and L-2 obtained in the respective Inventive and Comparative Examples were subjected to quality-test according to ASTM MAT in which 10,000 ppm of nickel and vanadium (V/Ni=2) were deposited on each catalyst to check metal tolerances. The test catalyst, initially calcined at 600° C. for one hour, was dipped in a benzene solution of nickel naphthenate and vanadium naphthenate and dried at 110° C., followed by calcination at 600° C. for 1.5 hours. For pseudo-equilibration, each catalyst was treated with steam at 770° C. for 6 hours and again calcined at 600° C. for one hour. Those catalysts which were not deposited with nickel and vanadium were also subjected to pseudo-equilibration by steam treatment at 770° C. and 810° C., respectively, for 6 hours and subsequently by calcination at 600° C. for one hour. The respective catalysts thus pretreated were tested in accordance with ASTM MAT with the results shown in Tables 1 and 2 and in FIGS. 1 and 2. Reaction conditions were as follows:

| Feedstock oil | desulfurized vacuum gas oil |
| --- | --- |
| Reaction temperature | 482° C. |
| Space velocity | 16 hr$^{-1}$ |
| Catalyst/oil ratio | 3 (by weight) |

TABLE 1

| Inventive Examples | Inventive Example 1 ||||||||||||
|---|---|---|---|---|---|---|---|---|---|---|---|---|
| Catalyst No. | A ||| B ||| C ||| D |||
| Metal trapping agent | CaSiO$_3$ ||| CaSiO$_3$ ||| CaSiO$_3$ ||| CaSiO$_3$ |||
| contents (wt %) | 10 ||| 10 ||| 10 ||| 10 |||
| P/M atomic ratio | 0 ||| 0.04 ||| 0.09 ||| 0.33 |||
| Elution of alkaline earth metal (wt %) | 8.3 ||| 6.1 ||| 4.5 ||| 3.9 |||
| Catalyst treating conditions | | | | | | | | | | | | |
| (X + Ni) deposit contents (ppm) | 0 | 10,000 | 0 | 0 | 10,000 | 0 | 0 | 10,000 | 0 | 0 | 10,000 | 0 |
| Steam temperature (°C.) | 770 | 770 | 810 | 770 | 770 | 810 | 770 | 770 | 810 | 770 | 770 | 810 |
| Catalytic activity | | | | | | | | | | | | |
| conversion (wt %) | 69.0 | 61.1 | 53.3 | 69.3 | 61.8 | 54.3 | 70.0 | 62.5 | 58.3 | 70.6 | 63.1 | 60.5 |
| gasoline (wt %) | 51.0 | 47.0 | 43.9 | 51.5 | 47.6 | 44.1 | 51.7 | 48.1 | 45.8 | 51.5 | 48.6 | 46.5 |
| hydrogen (wt %) | 0.03 | 0.41 | 0.20 | 0.03 | 0.40 | 0.02 | 0.03 | 0.39 | 0.02 | 0.03 | 0.38 | 0.02 |
| coke (wt %) | 1.9 | 2.0 | 1.0 | 1.9 | 1.9 | 1.0 | 1.9 | 2.0 | 1.1 | 1.9 | 1.9 | 1.1 |
| Octane number | 86.5 | — | — | 86.7 | — | — | 87.3 | — | — | 88.0 | — | — |

| Inventive Examples | Inventive Example 1 ||||||||| Inventive Example 2 |||
|---|---|---|---|---|---|---|---|---|---|---|---|---|
| Catalyst No. | E ||| F ||| G ||| H |||
| Metal trapping agent | CaSiO$_3$ ||| CaSiO$_3$ ||| CaSiO$_3$ ||| CaAlO$_4$ |||
| contents (wt %) | 10 ||| 10 ||| 10 ||| 10 |||
| P/M atomic ratio | 0.68 ||| 0.9 ||| 1.1 ||| 0.34 |||
| Elution of alkaline earth metal (wt %) | 3.5 ||| 2.8 ||| 2.5 ||| 2.3 |||
| Catalyst treating conditions | | | | | | | | | | | | |
| (X + Ni) deposit contents (ppm) | 0 | 10,000 | 0 | 0 | 10,000 | 0 | 0 | 10,000 | 0 | 0 | 10,000 | 0 |
| Steam temperature (°C.) | 770 | 770 | 810 | 770 | 770 | 810 | 770 | 770 | 810 | 770 | 770 | 810 |
| Catalytic activity | | | | | | | | | | | | |
| conversion (wt %) | 70.3 | 64.3 | 61.8 | 71.1 | 63.1 | 61.5 | 69.3 | 62.5 | 60.6 | 70.1 | 60.3 | 58.6 |
| gasoline (wt %) | 52.1 | 48.8 | 47.7 | 52.3 | 48.5 | 47.1 | 50.6 | 48.0 | 46.8 | 49.6 | 46.9 | 45.5 |
| hydrogen (wt %) | 0.03 | 0.38 | 0.02 | 0.03 | 0.37 | 0.02 | 0.03 | 0.38 | 0.02 | 0.03 | 0.38 | 0.02 |
| coke (wt %) | 1.9 | 1.9 | 1.1 | 1.9 | 1.9 | 1.2 | 1.9 | 1.9 | 1.1 | 1.8 | 2.1 | 1.0 |
| Octane number | 88.5 | — | — | 88.1 | — | — | 88.3 | — | — | — | — | — |

| Inventive Examples | Inventive Example 3 ||| Inventive Example 4 ||| Inventive Example 5 ||| Inventive Example 6 |||
|---|---|---|---|---|---|---|---|---|---|---|---|---|
| Catalyst No. | I ||| J ||| K ||| L |||
| Metal trapping agent | MgO—SiO$_2$—ZrO$_2$ ||| MgO—TiO$_2$ ||| BaO—ZrO$_2$ ||| CaZrO$_3$ |||
| contents (wt %) | 10 ||| 10 ||| 10 ||| 10 |||
| P/M atomic ratio | 0.48 ||| 0.46 ||| 0.49 ||| 0.47 |||
| Elution of alkaline earth metal (wt %) | 3.6 ||| 2.0 ||| 1.9 ||| 1.1 |||
| Catalyst treating conditions | | | | | | | | | | | | |
| (X + Ni) deposit contents (ppm) | 0 | 10,000 | 0 | 0 | 10,000 | 0 | 0 | 10,000 | 0 | 0 | 10,000 | 0 |
| Steam temperature (°C.) | 770 | 770 | 810 | 770 | 770 | 810 | 770 | 770 | 810 | 770 | 770 | 810 |
| Catalytic | | | | | | | | | | | | |

TABLE 1-continued

| activity | | | | | | | | | | | | |
|---|---|---|---|---|---|---|---|---|---|---|---|---|
| conversion (wt %) | 71.5 | 63.0 | 61.4 | 70.3 | 63.1 | 60.1 | 70.1 | 64.9 | 62.0 | 71.3 | 63.6 | 59.0 |
| gasoline (wt %) | 53.1 | 48.9 | 47.2 | 52.5 | 48.0 | 47.7 | 53.0 | 48.5 | 48.0 | 52.5 | 48.1 | 47.1 |
| hydrogen (wt %) | 0.03 | 0.40 | 0.02 | 0.03 | 0.39 | 0.02 | 0.03 | 0.37 | 0.02 | 0.03 | 0.39 | 0.02 |
| coke (wt %) | 2.0 | 2.0 | 1.2 | 1.9 | 2.0 | 1.2 | 1.8 | 1.9 | 1.2 | 1.9 | 2.0 | 1.1 |

TABLE 2

| Comparative Examples | Comparative Example 1 | | | Comparative Example 2 | | | Comparative Example 3 | | | Comparative Example 4 | | |
|---|---|---|---|---|---|---|---|---|---|---|---|---|
| Catalyst No. | M | | | N | | | K-2 | | | L-2 | | |
| Metal trapping agent | $CaO-SiO_2$ | | | $\theta-Al_2O_3$ | | | $BaO-ZrO_2$ | | | $CaZrO_3$ | | |
| contents (wt %) | 10 | | | 10 | | | 10 | | | 10 | | |
| P/M atomic ratio | 0.41 | | | ($P_2O_5$) | | | 0 | | | 0 | | |
| Elution of alkaline earth metal (wt %) | 20.3 | | | — | | | 9.1 | | | 21.9 | | |
| Catalyst treating conditions | | | | | | | | | | | | |
| (X + Ni) deposit contents (ppm) | 0 | 10,000 | 0 | 0 | 10,000 | 0 | 0 | 10,000 | 0 | 0 | 10,000 | 0 |
| Steam temperature (°C.) | 770 | 770 | 810 | 770 | 770 | 810 | 770 | 770 | 810 | 770 | 770 | 810 |
| Catalytic activity | | | | | | | | | | | | |
| conversion (wt %) | 65.9 | 51.0 | 41.0 | 69.9 | 59.3 | 60.3 | 70.5 | 60.1 | 48.0 | 70.9 | 59.9 | 50.1 |
| gasoline (wt %) | 50.1 | 40.6 | 36.8 | 49.2 | 45.0 | 46.7 | 52.8 | 47.0 | 42.9 | 51.8 | 46.9 | 43.0 |
| hydrogen (wt %) | 0.03 | 0.39 | 0.02 | 0.05 | 0.65 | 0.02 | 0.03 | 0.39 | 0.02 | 0.03 | 0.39 | 0.02 |
| coke (wt %) | 1.8 | 2.1 | 0.9 | 2.2 | 3.1 | 1.4 | 1.9 | 2.0 | 0.9 | 1.9 | 2.0 | 0.9 |

Figure 2:
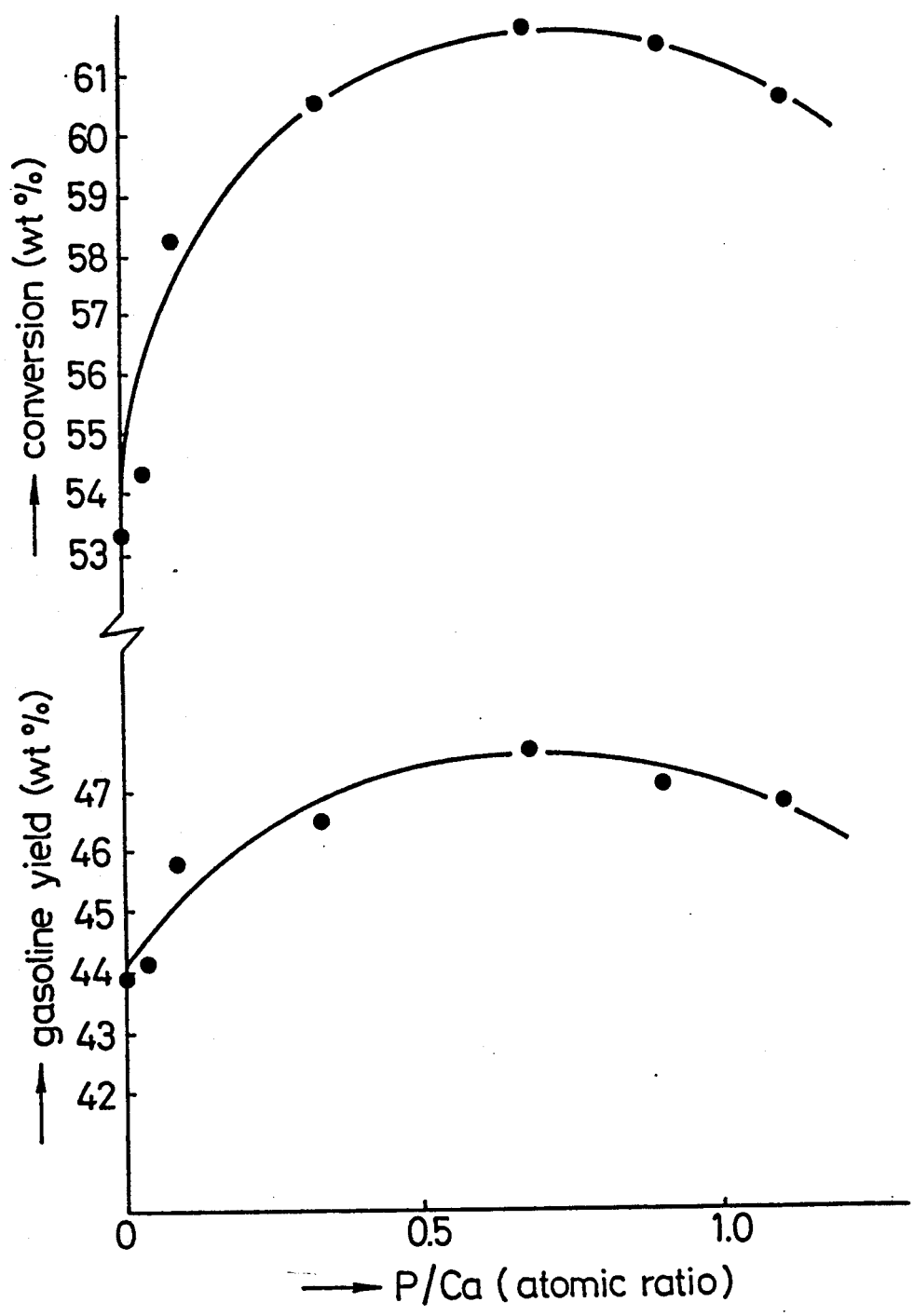
FIG. 2 is a graph similar to FIG. 1 but showing the results of hydrothermal stability test of the catalyst obtained in Inventive Example 1 where the catalyst composition was treated with steam at 810° C.

As appears clear from the test results depicted in Tables 1 and 2 as well as FIGS. 1 and 2, the catalyst compositions provided in accordance with the invention exhibit high contaminant metal tolerances, improved hydrothermal stability, increased conversion and gasoline yields.

The invention has been described with respect to the above various specific examples, but it is to be understood that the present invention is not limited thereto and that it can be otherwise practiced within the scope of the appended claims.

What is claimed is:

1. A catalyst composition for hydrocarbon cracking which comprises:
   (1) a crystalline aluminosilicate zeolite;
   (2) a metal trapping agent comprising a mixture of an alkaline earth metal oxide and a refractory oxide excluding a combination of magnesia and alumina, said metal trapping agent being treated with an aqueous solution comprising phosphoric ions; and
   (3) an inorganic oxide matrix excluding alumina-magnesia matrix; said catalyst composition, when dipped in Hcl solution having a pH of 3.0 at 30° C. for 20 minutes, having an alkaline earth metal eluted in an amount of less than 6.0 percent by weight in terms of oxide based on the weight of total alkaline earth metal component present in said catalyst composition.

2. A catalyst composition according to claim 1 which contains 5 to 50 percent by weight of said crystalline aluminosilicate zeolite, 3 to 50 percent by weight of said metal trapping agent, 10 to 90 percent by weight of said inorganic oxide matrix wherein the atomic ratio in terms of phosphorus relative to said alkaline earth metal is 0.05 to 1.2.

3. A catalyst composition according to claim 1 wherein said metal trapping agent is at least one member of the group consisting of $MgO-SiO_2$, $CaO-SiO_2$, $SrO-SiO_2$, $BaO-SiO_2$, $CaO-Al_2O_3$, $SrO-TiO_2$, $BaO-ZrO_2$, $MgO-SiO_2-Al_2O_3$, $CaO-SiO_2-TiO_2$, $SrO-Al_2O_3$, $BaO-Al_2O_3$, $MgO-TiO_2$, $CaO-TiO_2$, $BaO-TiO_2$, $MgO-ZrO_2$, $CaO-ZrO_2$, $CaO-SiO_2-Al_2O_3$, $MgO-CaO-SiO_2$, $MgO-CaO-Al_2O_3$, and $MgO-CaO-Al_2O_3-TiO_2$.

4. A catalyst composition according to claim 1 wherein said metal trapping agent contains a molar ratio of said alkaline earth metal to said refractory oxide in the range of 0.3–1.5.

5. A catalyst composition according to claim 1 wherein said inorganic oxide matrix is a matrix component selected from the group of silica, silica-alumina, alumina, phosphorus-alumina and silica-zirconia.

6. A catalyst composition according to claim 1 wherein said metal trapping agent is a particulate material having an average particle size of 0.1–50 microns.

7. A process for the preparation of a catalytic cracking catalyst composition which comprises the steps of:
   calcinating a metal trapping agent at a temperature above 850° C. and treating said metal trapping agent with a phosphoric ion-containing aqueous solution, said metal trapping agent being comprised of a mixture of precursors of an alkaline earth metal oxide and a refractory oxide excluding a combination of magnesia and alumina;
   making an admixture of said metal trapping agent with a crystalline aluminosilicate zeolite and a precursor of an inorganic oxide matrix excluding alumina-magnesia matrix; and spray-drying said admixture into a particulate product.

8. A process for the preparation of a catalytic cracking catalyst composition which comprises the steps of:
calcinating a metal trapping agent at a temperature above 850° C., said trapping agent being comprised of a mixture of precursors of an alkaline earth metal oxide and a refractory oxide excluding a combination of magnesia and alumina;
making an admixture of said trapping agent with a crystalline aluminosilicate zeolite and a precursor of an inorganic oxide matrix excluding alumina-magnesia matrix;
spray-drying said admixture into a particulate product; and
treating said particulate product with a phosphoric ion-containing aqueous solution.

9. A process according to claim 7 wherein treatment with said phosphoric ion-containing aqueous solution is conducted so that said phosphoric ion-containing aqueous solution in terms of phosphorus (P) and said alkaline earth metal precursor in terms of metal (M) remain at an atomic ratio (P/M) of 0.05–1.2 in said catalyst composition.

10. A process according to claim 9 wherein said phosphoric ion-containing aqueous solution is selected from the group of aqueous solutions of phosphoric acid, ammonium hydrogen phosphate, ammonium phosphate, phosphoric ester and mixtures thereof.

11. A process according to claim 8 wherein treatment with said phosphoric ion-containing aqueous solution is conducted so that said phosphoric ion-containing aqueous solution in terms of phosphorus (P) and said alkaline earth metal precursor in terms of metal (M) remain at an atomic ratio (P/M) of 0.05–1.2 in said catalyst composition.

* * * * *